(12) United States Patent
Bolouri

(10) Patent No.: US 8,892,080 B2
(45) Date of Patent: Nov. 18, 2014

(54) METHODS AND SYSTEMS OF COMMUNICATION INTEREXCHANGE ALLOWING FOR HETEROGENOUS TYPES OF COMMUNICATION BETWEEN HETEROGENOUS DEVICES

(71) Applicant: Ramin Bolouri, Alexandria, VA (US)

(72) Inventor: Ramin Bolouri, Alexandria, VA (US)

( * ) Notice: Subject to any disclaimer, the term of this patent is extended or adjusted under 35 U.S.C. 154(b) by 151 days.

(21) Appl. No.: 13/708,385

(22) Filed: Dec. 7, 2012

(65) Prior Publication Data

US 2013/0150101 A1   Jun. 13, 2013

Related U.S. Application Data

(60) Provisional application No. 61/567,724, filed on Dec. 7, 2011.

(51) Int. Cl.
*H04L 29/06* (2006.01)
*H04M 1/725* (2006.01)
*H04W 4/14* (2009.01)
*G06Q 10/10* (2012.01)

(52) U.S. Cl.
CPC *H04W 4/14* (2013.01); *G06Q 10/10* (2013.01)
USPC .................................. 455/414.3; 455/412.1

(58) Field of Classification Search
USPC .................. 455/412.1, 414.1, 414.2, 414.3
See application file for complete search history.

(56) References Cited

U.S. PATENT DOCUMENTS

| 7,877,296 B2 | 1/2011 | Sherwin et al. |
| 2002/0049644 A1 | 4/2002 | Kargman |
| 2008/0147514 A1 | 6/2008 | Shuster et al. |
| 2008/0270251 A1 | 10/2008 | Coelho et al. |
| 2011/0136516 A1 | 6/2011 | Ellis |

*Primary Examiner* — Christopher M Brandt
(74) *Attorney, Agent, or Firm* — Law Office of Llya Libenzon

(57) ABSTRACT

A method allowing for heterogeneous types of communication between heterogeneous devices includes receiving a message from a mobile device belonging to a message sender based on the type of the electronic device of the message sender, converting the message into a proprietary format, determining a device type of the message recipient using the user interface component, based on the data including the device number or the application number of a device belonging to the message recipient, converting the proprietary communication format of the message to a format corresponding to a device type of the message recipient, and delivering the approved communication message to the message recipient.

15 Claims, 3 Drawing Sheets

General overview of Invention

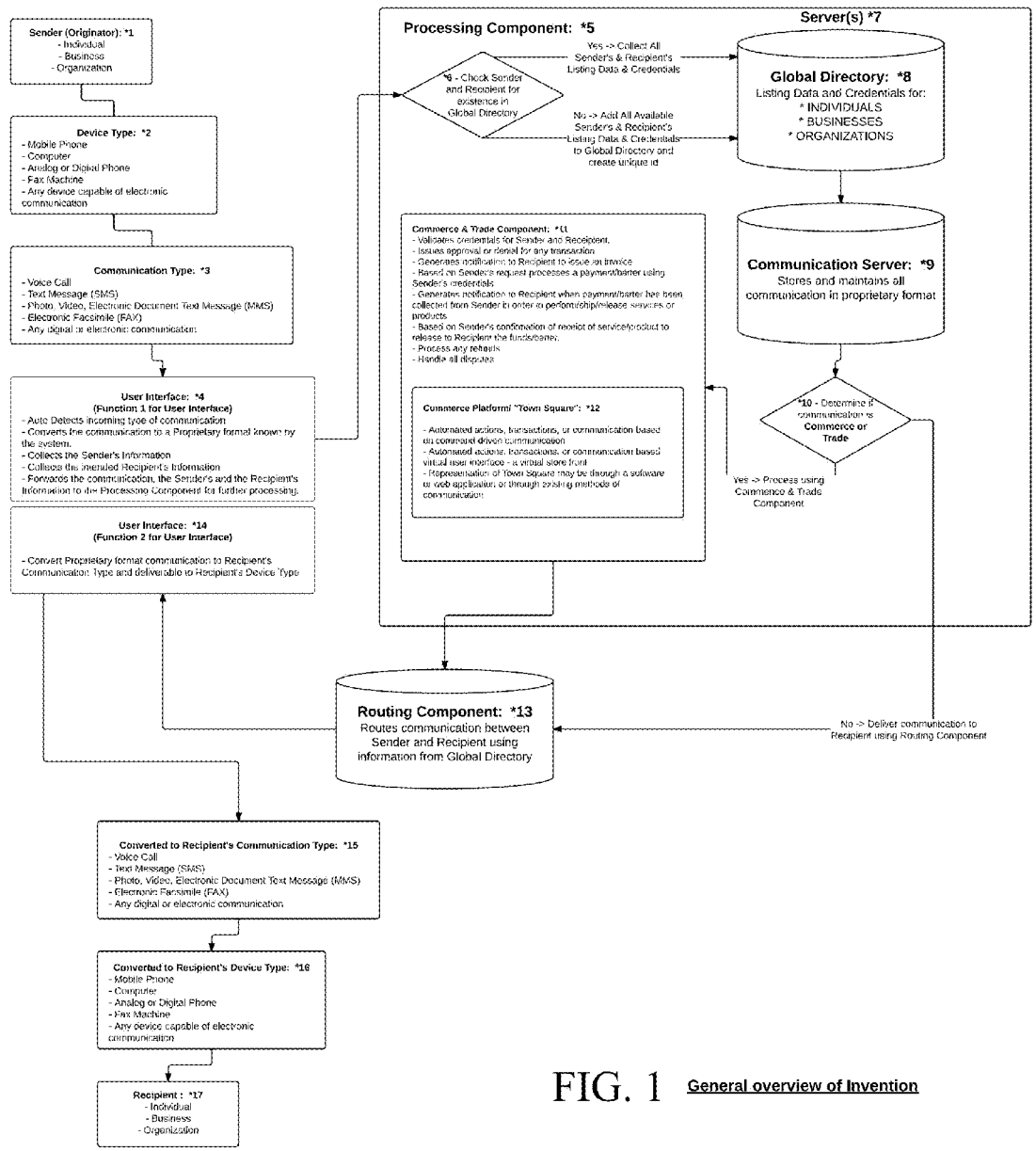
FIG. 1  General overview of Invention

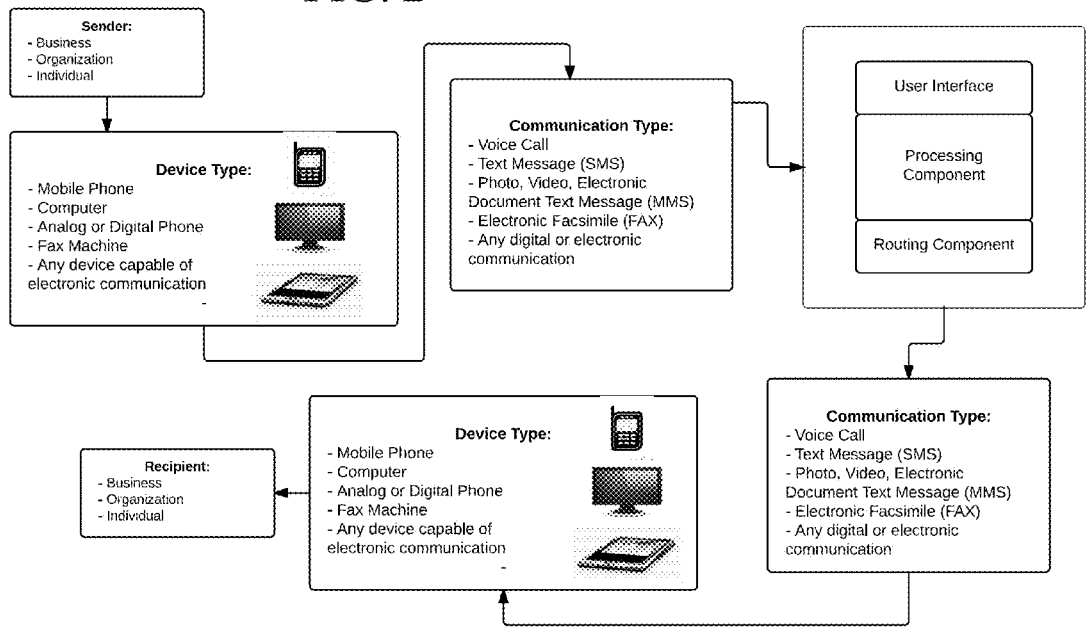
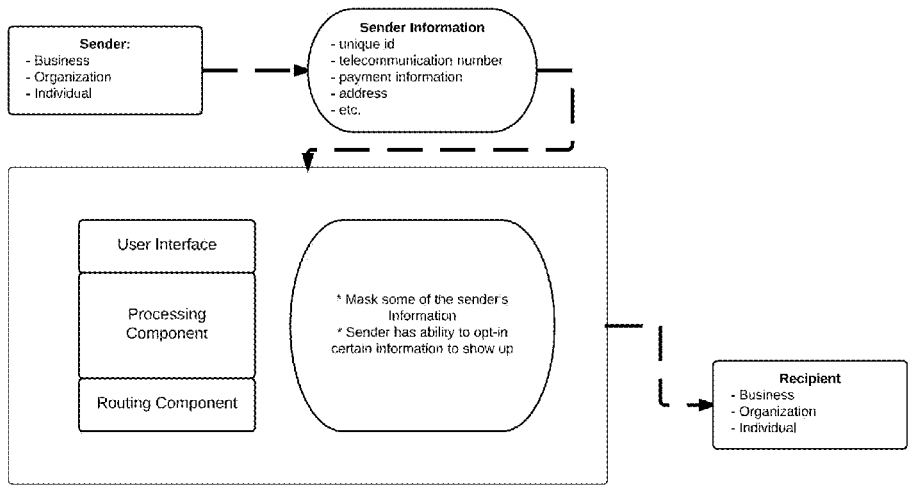

FIG. 4  Details Commerce Platform, Secured Commerce and Virtual Town Square
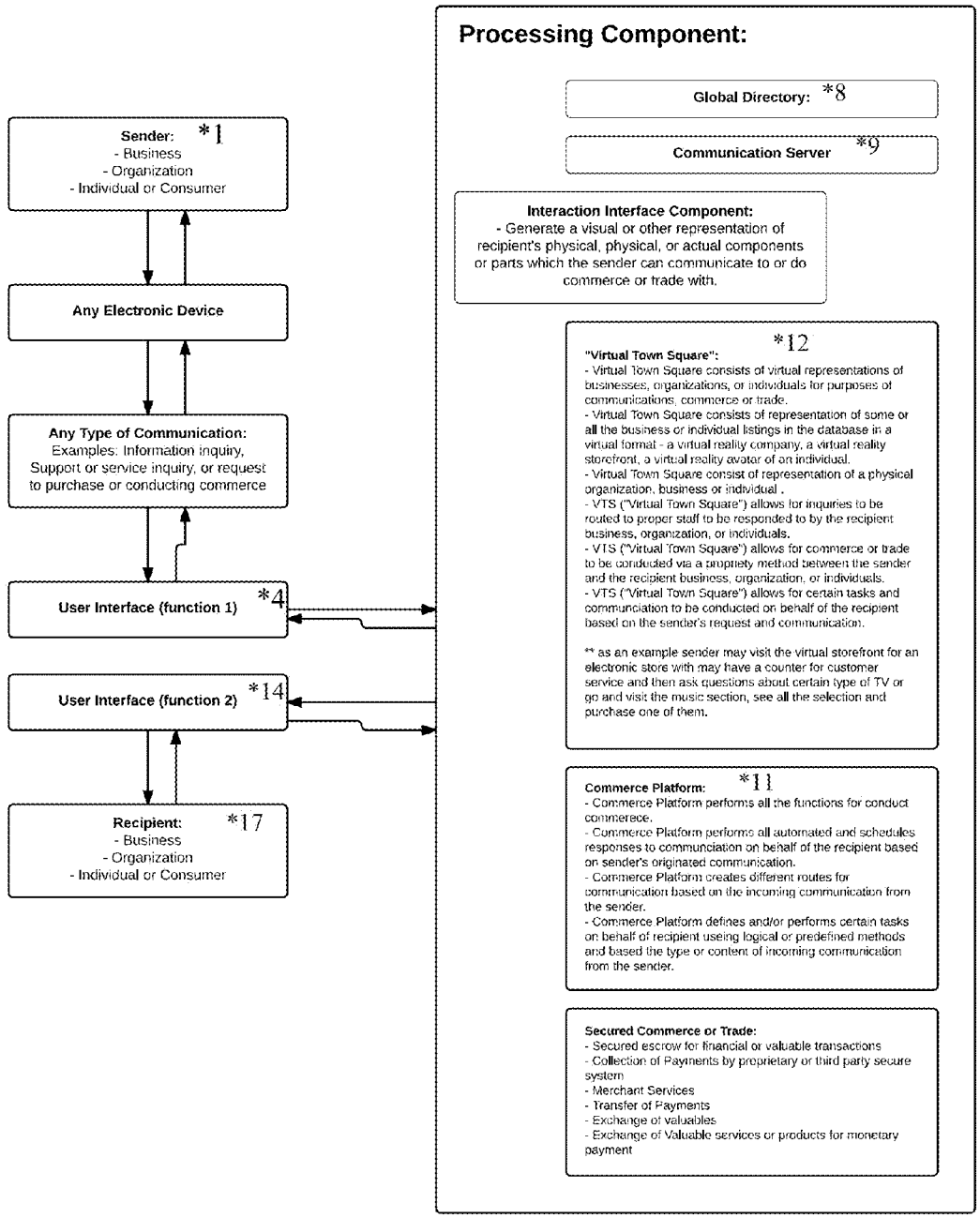

METHODS AND SYSTEMS OF COMMUNICATION INTEREXCHANGE ALLOWING FOR HETEROGENOUS TYPES OF COMMUNICATION BETWEEN HETEROGENOUS DEVICES

RELATED APPLICATION DATA

This application claims the priority of prior U.S. provisional application Ser. No. 61/567,724 filed on Dec. 7, 2011, which is hereby incorporated by reference herein in its entirety.

TECHNICAL FIELD

The present invention relates generally to communication methods and systems involving different devices and different type of communication methods and more specifically to short communication exchange systems such as mobile systems like SMS and other similar systems that provide for all transactions and communications, simple and complex, with minimal data transfer. It is also related to communication methods and systems for commercial transactions using text-messaging capabilities or other communication methods with different devices.

BACKGROUND ART

Text messaging is often used between private mobile phone users, as a substitute for voice calls in situations where voice communication is impossible or undesirable. Some text messages such as Short Message Service (SMS) can also be used for the remote controlling of appliances. The use of text messaging for business purposes has grown significantly as well. As companies seek competitive advantages, many turn to new technology, collaborative applications, and real-time messaging such as SMS, Instant Messaging (IM), and mobile communications.

Some particular uses of text messaging include the use of SMS for confirming delivery, ordering a service, or other tasks such as communication between a service provider and a client. Businesses, however, are usually not equipped with devices that are capable of conducting commercial transactions by virtue of text messaging. In addition, businesses usually list/advertise their land line phone numbers, but rarely do they provide mobile numbers available for consumers to initiate commercial transactions using text messaging. Thus, consumer is not provided with the system that allows searching and finding a business of interest and initiating a commercial transaction with that business using text-messaging capability of a mobile device or other communication device in a simple and yet efficient manner.

Therefore, there is a need to enable consumers to efficiently participate in commercial transactions using text-messaging capabilities of mobile devices by providing convenient, fast and reliable system and method for conducting commercial transactions via mobile wireless devices or other devices.

SUMMARY OF THE EMBODIMENTS

It is therefore an object of the subject invention to provide an efficient, convenient and reliable system and a method that enable consumers to efficiently participate in commercial transactions using any type of communication and text-messaging capabilities of mobile devices or other short messaging communication systems for conducting commercial transactions via mobile wireless devices or other devices.

The subject of the invention, in one aspect, results from realization that the efficient, convenient and reliable system and method that allow for efficient participation of consumers in commercial or personal transactions are effected by creating a global directory of business listings and individual listings and assigning identification numbers associated with each business and individual, by providing an application for mobile devices that allows originators of transactions to quickly search and locate the recipients and initiate commercial transaction by sending a short message routed by the server using the assigned ID's, and by providing the recipients with application for mobile devices (or other electronic devices) configured to receive inquiries from the server and send responses to the originator of transactions through the server.

A method of communication interexchange allowing inquiries and replies as well as commerce and trade is disclosed. The method includes providing a user interface component configured to accept different type of communications from different type of devices, providing at least one database comprising business listing data and customer listing data, maintaining the at least one database on a server, wherein the server is configured to periodically update the database with the business listing data and the customer listing data, assigning to each business listing at least one unique identification number and storing the at least one unique identification number in the at least one database, wherein the at least one unique identification number is used by the server to route information between message senders and message recipients, originating and sending a communication message from a mobile device of the message sender to a user interface component configured to recognize a type of the electronic device of the message sender and the message recipient, receiving and accepting the communication message by the user interface component, based on the type of the electronic device of the message sender or message recipient, converting the communication message into a proprietary format, processing approved communication message converted into a proprietary communication format using a processing component; the processing comprising: determining a device number of the message sender; determining a device number of the message recipient; if the electronic device is a computer, laptop, or tablet, then checking a unique application number; and checking whether device numbers of the message sender and message recipient are stored in the at least one database; if the device numbers are not stored, then storing the device number of the message sender and the message recipient in the at least one database; storing the approved communication message in the at least one database; routing the approved communication message to the user interface component; determining a device type of the message recipient using the user interface component, based on the data stored in the at least one database; the data comprising the device number or the application number if computer/laptop/tablet; converting the proprietary communication format of the approved communication message to a format corresponding to a device type of the message recipient; and delivering the approved communication message to the message recipient.

In a related set of embodiment, the method includes repeating the above-described steps in order for the message recipient to reply to the message sent by the message sender. If the approved communication message is of a Commerce & Trade type, the method can include verifying that both the message sender and the message recipient are qualified to conduct a commercial transaction or trade by checking the data associated with credentials for both the message sender and the message recipient stored in the at least one database, approving a qualification of the transaction based on the credentials for both the message sender and the message recipient, requesting and receiving an invoice for the goods or services, or both from the message sender, if the message sender is a transaction recipient, or from the message recipient, if the message recipient is a transaction recipient, storing the invoice in the at least one database maintained by the server, delivering the invoice from the transaction recipient to the transaction originator, collecting a payment from the transaction originator for the invoice, notating such a payment collection in the at least one database maintained by a server, notifying the original recipient that payment has been collected and product or service must be delivered, once the transaction recipient generates the message that the product or service has been delivered, then notifying the transaction originator of the delivery, and once the transaction originator has confirmed the delivery of product or service, then releasing the payment to the transaction recipient. The method can include assigning a unique telecommunication number associated with the phone number of the transaction recipient for communicating with transaction originator. The method can include keeping the information/credentials of the transaction originators confidential at all stages of commercial transaction. The method can include providing a commerce platform with virtual stores, stored on the server, for conducting commercial and non-commercial transactions and communication between the transaction originators and recipients. The method can also include providing the transaction recipient with a mobile device specifically configured to receive text messages from the server for conducting commercial transactions by way of subscribing for the service.

A system for implementing a method of communication interexchange is also disclosed. The system includes at least one of an electronic device of a message sender and an electronic device of a message recipient, at least one database comprising business listing data and customer listing data maintained on a server; the server having a memory, data storage devices and a central processing unit, wherein the server includes a user interface component configured to accept different type of communication from different type of devices, configured to periodically update the database with the business listing data and customer listing data, configured to route communication messages between a message sender and message recipient and to accept the communication messages; configured to convert the communication messages into a proprietary format, configured to assign to each business listing at least one unique identification number and storing the at least one unique identification number in the at least one database, and route the information between message senders and message recipients using the at least one unique identification number; wherein the server is configured to recognize a type of the electronic device of the message sender and the message recipient, approve and store the approved communication messages in the at least one database, route the approved communication messages to the user interface component, determine a device type of the message senders and message recipients based on the data stored in the at least one database, converting the proprietary communication format of the approved communication message to a format corresponding to a device type of the message recipient and delivering the approved communication message to the message recipient, wherein the server includes a processing component configured to determine device number of message senders and message recipients, checking a unique application number, and, if the electronic device is a computer, laptop, or tablet, checking whether device numbers of the message sender and message recipient are stored in the at least one database on the server.

In a related set of embodiments, the server can be configured to verify that both the message sender and the message recipient are qualified to conduct a commercial transaction or trade by checking the data associated with credentials for both the message sender and the message recipient stored in the at least one database, approve a qualification of the transaction based on the credentials for both the message sender and the message recipient, request and receive an invoice for the goods or services, or both from the message sender and message recipient, store the invoice in the at least one database maintained by the server, collect a payment from the transaction originator for the invoice, notate such a payment collection in the at least one database maintained by a server, notify the original recipient that payment has been collected and product or service must be delivered, notify the transaction originator of the delivery, and to release the payment to the transaction recipient once the transaction originator has confirmed the delivery of product or service. The server may be configured to assign a unique telecommunication number associated with the phone number of the transaction recipient for communicating with transaction originator. The server can be configured to keep the information/credentials of the transaction originators confidential at all stages of commercial transaction or other type of communication exchange. The system can include a commerce platform with virtual stores, stored on the server, for conducting commercial and non-commercial transactions and communication between the transaction originators and recipients. The system can also include a mobile device specifically configured to receive text messages from the server for conducting commercial transactions by way of subscribing for the service.

Other aspects, embodiments and features of the invention will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The preceding summary, as well as the following detailed description of the invention, will be better understood when read in conjunction with the attached drawings. For the purpose of illustrating the invention, presently preferred embodiments are shown in the drawings. It should be understood, however, that the invention is not limited to the precise arrangements and instrumentalities shown.

FIG. 1 is a schematic diagram illustrating a system for implementing a method in accordance with one embodiment of the present invention.

FIG. 2 is a schematic diagram detailing type of devices and type of communication that can be used for practicing the method of present invention.

FIG. 3 is a schematic diagram illustrating a confidentiality process in accordance with one embodiment of the present invention.

FIG. 4 is a schematic diagram detailing commerce, secured commerce and virtual town square platforms in accordance with one embodiment of the present invention.

DETAILED DESCRIPTION OF SPECIFIC EMBODIMENTS

Definitions. As used in this description and the accompanying claims, the following terms shall have the meanings indicated, unless the context otherwise requires. A "mobile device" is an electronic device such as a computer, laptop, smart phone, tablet, cell phone, landline phone, and the like or any electronic device capable of any type of communication. User interface component includes hardware and software for implementing the method.

A sender or message sender is a communication or transaction originator.

A recipient or message recipient is the receiver of transaction or communication.

Transaction originator can be the message sender or message recipient.

Transaction recipient can be the message sender or message recipient.

Types of communication may include Voice calls, text messages (SMS), photos (MMS), video (MMS or streaming), facsimiles, documents (any data type) or financial transactions involving payments or sending or receiving money as well as trade or barter.

Type of devices may include telephones, mobile phones, computers, tablets, or any electronic device capable of sending or receiving electronic information.

Business is a for-profit, non-profit or any organization which provides any service or Product.

Mobile Device is defined as any electronic device that can be used for any type of communication.

Approved communication is any communication from sender or recipient where it meets the format and qualification of electronic communication based on proprietary definitions of the invention.

Interaction interface component creates a virtual representation of business, organization or individual based on type of device used by sender or recipient and allows communication, commerce or trade in an automated, logical or predefined fashion or non-automated human interaction between sender and recipient with or without any human interaction.

Communication method information means any relevant information regarding the format of the communication, the language, the characteristic or the even the device for the communication. Such communication method information is used to alter sender or recipient communication and convert from or convert to the proprietary communication format of the system.

Device number associates a Mobile Device to its Communication Method Information.

Proprietary Communication Format of the system is the system method used to convert any type of heterogeneous communication related to sender and recipient from and to the proprietary communication format of the system in order to receive communication from the Communication sender and deliver to communication recipient.

A Valid phone number is defined as a telephone number recognized by all telecommunication companies to deliver an electronic communication to or receive communication from.

Telecommunication Number is a valid phone number.

A credentials means any specific and relevant information including a valid phone number, personal or business information or financial information.

Business listing data includes any and all available business locations and type of business, their devices for communication and data about such devices, and detail business information including their geo location data, employees, rating of the business, and the like.

Customer listing data includes listings of individual customers including their name and other relevant information, address, information on their electronic devices, mobile device information, and the like.

A communication message can include information inquiry, service and customer relationship management, and Commerce & Trade or any other communication of any sort.

Coupled means directly connected or indirectly connected, such as connected via a network.

FIG. 1 illustrates, in accordance with one embodiment of the present invention, a system for implementing a method of communication interexchange that allows for heterogeneous type of communication between heterogeneous devices for exchanging inquiries and replies as well as conducting commerce and trade. The system may include an electronic device 2 of a message sender 1. The sender 1 can be an individual, business, or organization. The mobile device 2 can be a mobile phone, computer, analog phone, digital phone, fax machine, or any other device capable of electronic communication. The sender 1 can send a message or messages of a communication type 3 that includes voice call, text messages (SMS), photo, video, electronic document test message (MMS), electronic facsimile (FAX), or any digital or electronic communication as illustrated in detail in FIG. 2. The system includes at least one database such as global directory database 8 comprising business listing data and customer listing data maintained on a server 7 having a memory, data storage devices and a central processing unit. The server is coupled to a user interface component 4 configured to auto detect incoming type of communication, convert the communication into a proprietary format know by the system, collect the sender's information, collect the intended recipient's information, and forward the communication, the sender's and the recipient's information to a processing component 5 for further processing. The processing component is configured to check the sender and recipient for existence in the global directory database 8, to collect all sender's and recipient's listing data and credential, and to add all available sender's and recipient's listing data and credentials to global directory database 8 and create a unique identification number. The server is coupled to a user interface component 14 configured to convert the proprietary format of the communication to a format associated with a recipient's communication type 15 and recipient's device type 16 and delivery the communication to the recipient 17. The server 7 is configured to route communication between senders and recipients using data from the global directory database 8 by a routing component 13 coupled to the server 7. The system includes communication server 9 that is configured to store and maintain all communication in proprietary format. In some instances, the system may also include a commerce & trade component 11 and commerce platform ("Town Square") 12 coupled to server 7.

The system described above is suitable for implementing a method for communication interexchange. Referring to FIG. 1, the method includes providing user interface component 4 configured to accept different type of communications from different type of devices, providing at least one database such as global directory database 8 comprising business listing data and customer listing data, maintaining the at least one database on server 7, wherein the server 7 is configured to periodically update the database 8 with the business listing data and the customer listing data, assigning to each business listing at least one unique identification number and storing the at least one unique identification number in the at least one database 8, wherein the at least one unique identification number is used by the server 7 to route information between message senders 1 and message recipients 17, originating and sending a communication message from a mobile device of the message sender 1 to a user interface component 4 configured to recognize a type of the electronic device of the message sender and the message recipient, receiving and accepting the communication message by the user interface component 4, based on the type of the electronic device 2 of the message sender 1 or message recipient 17, converting the communication message into a proprietary format, processing approved communication message converted into a proprietary communication format using a processing component 5. In some instances, the processing may include determining a device number of the message sender; determining a device number of the message recipient; if the electronic device is a computer, laptop, or tablet, then checking a unique application number; and checking whether device numbers of the message sender and message recipient are stored in the at least one database. If the device numbers are not stored, then storing the device number of the message sender and the message recipient in the at least one database 8; storing the approved communication message in the at least one database 8; routing the approved communication message to the user interface component 14; determining a device type of the message recipient using the user interface component 4, based on the data stored in the at least one database 8; the data comprising the device number or the application number if computer/laptop/tablet; converting the proprietary communication format of the approved communication message to a format corresponding to a device type of the message recipient 17; and delivering the approved communication message to the message recipient 17.

The message recipient 17 can reply to the message sent by the message sender 1 by repeating the process described above.

If the approved communication message is of a Commerce & Trade type, the method can include verifying that both the message sender and the message recipient are qualified to conduct a commercial transaction or trade by checking the data associated with credentials for both the message sender and the message recipient stored in the at least one database, approving a qualification of the transaction based on the credentials for both the message sender and the message recipient, requesting and receiving an invoice for the goods or services, or both from the message sender, if the message sender is a transaction recipient, or from the message recipient, if the message recipient is a transaction recipient, storing the invoice in the at least one database maintained by the server, delivering the invoice from the transaction recipient to the transaction originator, collecting a payment from the transaction originator for the invoice, notating such a payment collection in the at least one database maintained by a server, notifying the original transaction recipient that payment has been collected and product or service must be delivered, once the transaction recipient generates the message that the product or service has been delivered, then notifying the transaction originator of the delivery, and once the transaction originator has confirmed the delivery of product or service, then releasing the payment to the transaction recipient. The method can include assigning a unique telecommunication number associated with the phone number of the transaction recipient for communicating with transaction originator; thereby allowing a transaction originator to originate any type of communication messages in a format including voice calls, text messages (SMS), photo and video texting (MMS), facsimile (FAX), digital document, or combination thereof, as detailed in FIG. 2, and allowing the recipient to receive and respond to the communication messages in said format. The method can include keeping the information/credentials of the transaction originators confidential at all stages of commercial transaction, trade or just communication, as shown in FIG. 3.

Referring to FIG. 4, the method can include providing a commerce platform with virtual stores or virtual representations, stored on the server, for conducting commercial and non-commercial transactions and communication between the transaction originators and recipients. The commerce platform 12 called "Virtual Town Square" includes virtual representations of business, organizations, or individual for purposes of communication, commerce or trade or just communication. It includes representation of some or all business and individual listings in the database 8 in a virtual format, such as virtual reality company, a virtual reality storefront, and a virtual reality avatar of an individual. It may include a representation of a physical organization, business or individual. The virtual town square platform 12 allows for inquiries to be routed to proper staff to be responded to by the recipient business, organization, or individuals. It allows for commerce or trade to be conducted via a proprietary method between the sender 1 and the recipient 17 both of which can be a business, organization or individuals, as well as allows for certain tasks and communication to be conducted on behalf of the recipient 17 based on the sender's request and communication. It also may allow for some automated functionality or automated communication to be generated based on the type and content of the communication originated by a sender of communication. For example, in one case, the sender 1 may visit the virtual storefront having an electronic store which may have a counter for customer service and then ask questions about certain type of TV or go and visit the music section, see all the selections and purchase one of them using the virtual town square platform. As shown in FIG. 4, the system can include a commerce platform 11 configured to perform all the functions for conducting commerce. It can automatically schedule responses to communication messages on behalf of the recipient 17 based on the sender's originated communication. The commerce platform 11 is configured to create different routes for communication based on the incoming communication form the sender 1, define and/or perform certain tasks on behalf of the recipient 17 using logical or pre-determined methods based on the type or content of incoming communication from the sender 1. The system may also include a secured commerce or trade platform for implementing a secured escrow for financial or valuable transactions, collection of payments by proprietary or third party secure system, and provide for merchant services, transfer of payments, exchange of valuable, exchange of valuable services or products form monetary payment. The platforms described above are in communication with the user interface components such as user interface component 4 and user interface component 14.

The method can also include providing the transaction recipient with a mobile device specifically configured to receive text messages from the server for conducting commercial transactions by way of subscribing for the service.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method of communication interexchange allowing for heterogeneous types of communication between heterogeneous devices for exchanging inquiries and replies as well as conducting commerce and trade, the method comprising:

a. providing a user interface component configured to accept different types of communications from different types of devices and to recognize a type of an electronic device;
b. providing at least one database comprising business listing data and customer listing data;
c. maintaining the at least one database on a server, wherein the server is configured to periodically update the database with the business listing data and the customer listing data as well as all device data and types of communication data;
d. assigning to each business listing at least one unique identification number and storing the at least one unique identification number in the at least one database; wherein said at least one unique identification number is used by the server to route information between message senders and message recipients;
e. originating and sending a communication message from a mobile device of a message sender to the user interface component;
f. receiving and accepting the communication message by the user interface component;
g. based on the type of the electronic device of the message sender or a message recipient, converting the communication message into a proprietary format;
h. processing the communication message converted into the proprietary format using a processing component;
i. if the device numbers are not stored, then storing the device number of the message sender and a message recipient in the at least one database;
j. storing the approved communication message in the at least one database;
k. routing the approved communication message to the user interface component;
l. determining a device type of a device used by the message recipient using the user interface component, based on the data stored in the at least one database; the data comprising the device number or an application number if the device used by the message recipient is a computer, a laptop, a tablet, or a device without a valid phone number;
m. converting the proprietary format of the communication message to a format corresponding to the device type of the device used by the message recipient; and
n. delivering the communication message to the message recipient.

2. A method according to claim 1, wherein the processing comprises:
i. determining a device number of the message sender;
ii. determining a device number of the message recipient;
iii. if the electronic device used by the message sender or the electronic device used by the message recipient is a computer, laptop, or tablet, or a device without a valid phone number, then checking a unique application number; and
iv. checking whether device numbers of the message sender and message recipient are stored in the at least one database.

3. A method according to claim 1, further comprising repeating steps (a)-(n) in order for the message recipient to reply to the message sent by the message sender.

4. A method according to claim 1, wherein if the communication message is of a Commerce & Trade type, the method further comprises:
a. after performing steps (a)-(k), verifying that both the message sender and message recipient are qualified to conduct a commercial transaction or trade by checking data associated with credentials for both the message sender and the message recipient stored in the at least one database;
b. approving a qualification of the transaction based on the credentials for both the message sender and the message recipient;
c. performing steps (l)-(n) according to claim 1;
d. requesting and receiving an invoice for goods, services, or both from the message sender, if the message sender is a transaction recipient, or from the message recipient, if the message recipient is a transaction recipient;
e. storing the invoice in the at least one database maintained by the server;
f. performing steps (l)-(n) according to claim 1 repeated for such a request;
g. performing steps (a)-(n) according to claim 1 for delivering the invoice from the transaction recipient to a transaction originator;
h. collecting a payment from the transaction originator for the invoice;
i. notating the payment collection in the at least one database maintained by the server;
j. notifying the transaction recipient that payment has been collected and a product or service must be delivered by performing steps (a)-(n) according to claim 1;
k. once the transaction recipient generates a message that the product or service has been delivered, then notifying the transaction originator of the delivery by performing steps (a)-(n) according to claims 1; and
l. once the transaction originator has confirmed the delivery of the product or service, then releasing the payment to the transaction recipient.

5. The method of claim 4 further comprising assigning a unique telecommunication number associated with a phone number of the transaction recipient for communicating with the transaction originator; thereby allowing the transaction originator to originate any type of communication messages in a format comprising voice calls, text messages (SMS), photo and video texting (MMS), facsimile (FAX), digital document, or combination thereof, and allowing the transaction recipient to receive and respond to the communication messages in said format.

6. The method of claim 4, wherein the credentials of the transaction originators remains confidential at all stages of the commercial transaction unless the transaction originator chooses to share such information with the transaction recipient.

7. The method of claim 4, further comprising providing a commerce platform with virtual stores, virtual representations, and virtual avatars, stored on the server, for conducting commercial and non-commercial transactions and communication between the transaction originator and recipient; wherein an interaction interface component allows the mobile device of the message sender and the message recipient to represent and interact with such virtual representations based on logical or predefined proprietary methods; wherein the virtual stores provide the ability to automatically perform any and all functions as specified to conduct, automate and facilitate any and all types of communication, commerce or trade between the transaction originator and the transaction recipient with or without any human transaction, thereby acting like a physical location of business for the transaction recipient but in a virtual form for anyone to conduct communication, commerce or trade with the transaction recipient.

8. The method of claim 4, wherein the transaction recipient is provided with a mobile device specifically configured to receive text messages from the server for conducting commercial transactions by way of subscribing for a service.

9. A system for implementing a method of communication interexchange according to claim 1, said system comprising:
at least one of an electronic device of a message sender and an electronic device of a message recipient;
at least one database comprising business listing data and customer listing data maintained on a server; the server having a memory, data storage devices and a central processing unit, wherein the server includes a user interface component configured to accept different types of communication from different types of devices, configured to periodically update the database with the business listing data and customer listing data, configured to route communication messages between the at least one message sender and the at least one message recipient and to accept the communication messages; configured to convert the communication messages into a proprietary format, configured to assign to each business listing at least one unique identification number and storing the at least one unique identification number in the at least one database, and route the information between the at least one message sender and the at least one message recipient using the at least one unique identification number; wherein the server is configured to recognize a type of the electronic device of the message sender and the message recipient, approve and store the communication messages in the at least one database, route the communication messages to the user interface component, determine a device type of the message senders and message recipients based on the data stored in the at least one database, convert the proprietary communication format of the communication message to a format corresponding to a device type of the message recipient and deliver the communication message to the message recipient, wherein the server includes a processing component configured to determine a device number of the electronic device of the at least one message sender and the electronic device of the at least one message recipient, check a unique application number, if the electronic device of the at least one message sender or of the at least one message recipient is a computer, laptop, or tablet, and check whether the device numbers of the electronic device of the at least one message sender and electronic device of the at least one message recipient are stored in the at least one database on the server.

10. A system according to claim 9, wherein the processing component is configured to determine a device number of the electronic device of the at least one message sender and a device number of the electronic device of the at least one message recipient; to check a unique application number if the electronic device of the at least one message sender and of the at least one message recipient is a computer, laptop, or tablet, or a device without a valid phone number; and to check whether device numbers of the electronic device of the at least one message sender and the electronic device of the at least one message recipient are stored in the at least one database.

11. A system according to claim 9, wherein the server further configured to verify that both the at least one message sender and the at least one message recipient are qualified to conduct a commercial transaction or trade by checking data associated with credentials for both the at least one message sender and the at least one message recipient stored in the at least one database;
approve a qualification of the transaction based on the credentials for both the at least one message sender and the at least one message recipient;
request and receive an invoice for goods, services, or both from the at least one message sender and the at least one message recipient;
store the invoice in the at least one database maintained by the server;
collect a payment from a transaction originator for the invoice;
notate such a payment collection in the at least one database maintained by the server;
notify the transaction recipient that payment has been collected and the product or service must be delivered;
notify the transaction originator of the delivery; and
release the payment to the transaction recipient once the transaction originator has confirmed the delivery of product or service.

12. . A system according to claim 11, wherein the server is further configured to assign a unique telecommunication number associated with a phone number of the transaction recipient for communicating with transaction originator; thereby allowing the transaction originator to originate any type of communication messages in a format comprising voice calls, text messages (SMS), photo and video texting (MMS), facsimile (FAX), digital document, or combination thereof, and allowing the recipient to receive and respond to the communication messages in said format.

13. A system according to claim 11, wherein the server is configured to keep information and credentials of the transaction originator confidential at all stages of the commercial transaction.

14. A system according to claim 11, further comprising a commerce platform with virtual stores, virtual representations, and virtual avatars, stored on the server, for conducting commercial and non-commercial transactions and communication between the transaction originator and recipient; wherein an interaction interface component allows the mobile device of the at least one message sender and at least one message recipient to represent and interact with such virtual representations based on logical or predefined proprietary methods; wherein the virtual stores provide the ability to automatically perform any and all functions as specified to conduct, automate and facilitate any and all types of communication, commerce or trade between the transaction originator and the transaction recipient with or without any human transaction, thereby acting like a physical location of business for the transaction recipient but in a virtual form for anyone to conduct communication, commerce or trade with the transaction recipient.

15. A system according to claim 9, wherein the system further comprises a mobile device specifically configured to receive text messages from the server for conducting commercial transactions by way of subscribing for a service.

* * * * *